United States Patent [19]

Fujisawa et al.

[11] Patent Number: 5,247,021

[45] Date of Patent: Sep. 21, 1993

[54] PROCESS FOR PREPARATION OF A POLYMER HAVING REACTIVE TERMINAL GROUP

[75] Inventors: Hiroshi Fujisawa; Koji Noda, both of Kobe, Japan

[73] Assignee: Kanegafuchi Kagaku Kogyo Kabushiki Kaisha, Osaka, Japan

[21] Appl. No.: 933,903

[22] Filed: Aug. 27, 1992

Related U.S. Application Data

[63] Continuation of Ser. No. 646,715, Feb. 5, 1991, abandoned.

[30] Foreign Application Priority Data

Jun. 6, 1989 [JP] Japan .................................. 1-144634
Oct. 27, 1989 [JP] Japan .................................. 1-281331
Apr. 13, 1990 [JP] Japan .................................. 2-99067

[51] Int. Cl.$^5$ .............................. C08F 8/18; C08F 8/26; C08F 10/10
[52] U.S. Cl. .................................. 525/254; 525/244; 525/342; 526/90; 526/194; 526/221; 526/348; 526/348.6; 526/348.7
[58] Field of Search .................. 526/194, 348, 348.6, 526/348.7; 525/254, 342

[56] References Cited

U.S. PATENT DOCUMENTS 4,342,849 8/1982 Kennedy .......................... 525/333.7
4,758,631 7/1988 Kennedy ............................. 525/245

FOREIGN PATENT DOCUMENTS 1272547 8/1990 Canada .

Primary Examiner—Joseph L. Schofer
Assistant Examiner—Fred Zitomer
Attorney, Agent, or Firm—Armstrong, Westerman, Hattori, McLeland & Naughton

[57] ABSTRACT

Disclosed is a process for preparing an isobutylene-type allyl-terminated polymer, the process comprising mixing:

(A) a cationically polymerizable isobutylene-containing monomer;

(B) an organic compound serving as an initiator and concurrently as a chain transfer agent, the organic compound being represented by the formula (I)

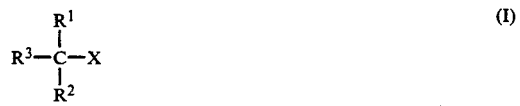

(C) at least one Lewis acid selected from the group consisting of $(C_2H_5)_2AlCl$, $(C_2H_5)AlCl_2$, $SnCl_4$ and $TiCl_4$; and (D) a compound serving as an end capping agent, the compound being represented by the formula (II)

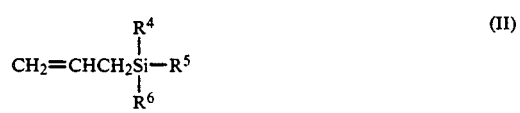

whereby the cationically polymerizable monomer is polymerized.

4 Claims, 1 Drawing Sheet

Apparatus for continuous polymerization

PROCESS FOR PREPARATION OF A POLYMER HAVING REACTIVE TERMINAL GROUP

This application is a continuation of application Ser. No. 07/646,715 filed Feb. 5, 1991 (now abandoned).

FIELD OF THE INVENTION

The present invention relates to an isobutylene-type allyl-terminated polymer.

BACKGROUND ART

Functional group-terminated polymers such as polymers having hydroxyl groups or the like introduced to both ends of the molecule are useful as materials for polyurethane, adhesives, modifiers, coating compositions, sealing agents, etc.

Isobutylene-type unsaturated group-terminated polymers are known as such functional group-terminated polymers.

For example, a process for preparing an isobutylene-type functional group-terminated polymer is reported (specification of U.S. Pat. No. 4,524,188) in which a Cl-terminated polymer is prepared by the Inifer method (specification of U.S. Pat. No. 4,276,394) comprising cationically polymerizing isobutylene in the presence of 1,4-bis($\alpha$-chloroisopropyl)-benzene (hereinafter referred to as "p-DCC") serving as an initiator and concurrently as a chain transfer agent, and $BCl_3$ serving as a catalyst, and the obtained polymer is subjected to reaction for removal of HCl from the polymer.

However, the reported method involves numerous reaction steps, and therefore is not convenient.

A simplified method for introducing unsaturated groups to an isobutylene-type Cl-terminated polymer is known in which the isobutylene-type polymer with Cl groups at both ends obtained by the Inifer method is reacted with allyltrimethylsilane in the presence of a Lewis acid to thereby convert into a polymer having allyl groups at both ends (Japanese Unexamined Patent Publication No. 105005/1988).

Our research revealed, however, that the process disclosed in Japanese Unexamined Patent Publication No. 105005/1988 has problems. For example, unsaturated groups are introduced to ends of the molecule in a low ratio, and it is necessary to use an expensive material.

DISCLOSURE OF THE INVENTION

An object of the present invention is to provide a process as simple as the process described in Japanese Unexamined Patent Publication No. 105005/1988 for preparing an isobutylene-type unsaturated group-terminated polymer.

Another object of the invention is to provide a process for preparing an isobutylene-type unsaturated group-terminated polymer having the unsaturated groups introduced in a high ratio.

A further object of the invention is to provide an inexpensive process for preparing an isobutylene-type unsaturated group-terminated polymer.

Other objects and features of the present invention will become more apparent from the following description.

In view of the foregoing present situation, we conducted extensive research and found that all of the above-mentioned objects can be accomplished by carrying out a specific reaction process using a specific Lewis acid.

According to the present invention, there is provided a process for preparing an isobutylene-type allyl-terminated polymer, the process comprising mixing:

(A) a cationically polymerizable isobutylene-containing monomer;

(B) an organic compound serving as an initiator concurrently as a chain transfer agent, the organic compound being represented by the formula (I)

wherein X is a halogen atom, a RCOO— group (wherein R is a monovalent organic group, the same hereinafter) or a RO-group, $R^3$ is a polyvalent aromatic ring group or a substituted or unsubstituted polyvalent aliphatic hydrocarbon group, and $R^1$ and $R^2$ are the same or different and each represent a hydrogen atom or a substituted or unsubstituted monovalent hydrocarbon group, provided that when $R^3$ is a polyvalent aliphatic hydrocarbon group, R and $R^2$ can not be concurrently a hydrogen atom;

(C) at least one Lewis acid selected from the group consisting of $(C_2H_5)_2AlCl$, $(C_2H_5)AlCl_2$, $SnCl_4$ and $TiCl_4$; and (D) a compound serving as an end capping agent, the compound being represented by the formula (II)

wherein $R^4$, $R^5$ and $R^6$ are the same or different, and each represent a monovalent organic group or a monovalent organic group having 1 to 3 carbon atoms replaced by silicon atoms, whereby the cationically polymerizable monomer is polymerized.

The foregoing process of the invention has features of being convenient, low in costs because of using an inexpensive Lewis acid, capable of introducing unsaturated groups in a high ratio to the ends, and also an excellent feature of giving an isobutylene-type polymer which has a narrow molecular weight distribution. With a narrow molecular weight distribution, the polymer has the advantages that the polymer is low in viscosity and therefore easy to handle, for example easily kneadable in mixing the components and that when crosslinked, the polymer provides a cured product which is outstanding in mechanical properties and the like.

It is possible in the invention to reduce the amount of the component (C), hence economical. Since the polymerization rate can be controlled by adjusting the amount of the component (C) which participates in the polymerization reaction, the rate of heat evolution in the polymerization reaction can be regulated. The reduction of heat evolution rate can control the polymerization rate without use of a large-scale cooler in the large-scale manufacture of isobutylene-type allyl-terminated polymer, thereby making the process economical.

The process of the invention has an additional advantage that even when the polymerization reaction is conducted at a relatively high temperature of −40° to 10° C., an isobutylene-type polymer with terminal functional groups formed in a high ratio can be obtained.

The term "cationically polymerizable isobutylene-containing monomer" used herein includes not only a monomer consisting of isobutylene alone, but a monomer comprising a combination of isobutylene and up to 50% by weight (percent by weight being simply indicated hereinafter by "%") of a cationically polymerizable monomer which is copolymerizable with isobutylene.

Examples of the cationically polymerizable monomer which is copolymerizable with isobutylene are olefins having 3 to 12 carbon atoms, conjugated dienes, vinyl ethers, aromatic vinyl compounds, vinyl silanes, etc. among which olefins having 3 to 12 carbon atoms, conjugated dienes and the like are preferred.

Specific examples of the cationically polymerizable monomer which is copolymerizable with isobutylene are propylene, 1-butene, 2-butene, 2-methyl-1-butene, 3-methyl-2-butene, pentene, 4-methyl-1-pentene, hexene, vinylcyclohexane, butadiene, isoprene, cyclopentadiene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, γ-methacryloyloxypropyltrimethoxysilane, γ-methacryloyloxypropylmethyldimethoxysilane, etc. Among these monomers, for example, propylene, 1-butene, 2-butene, styrene, butadiene, isoprene, cyclopentadiene, etc. are suitable. These cationically polymerizable monomers which are copolymerizable with isobutylene can be used singly or at least two of them are usable in mixture.

Examples of useful organic compounds of the formula (I) which are used as an initiator and also as a chain transfer agent in the invention include:
compounds of the formula (III)

$$AY_n \qquad (III)$$

wherein A is a group having 1 to 4 aromatic rings, Y is a group attached to an aromatic ring represented by the formula (IV)

$$\begin{array}{c} R^7 \\ | \\ -C-X \\ | \\ R^8 \end{array} \qquad (IV)$$

(wherein $R^7$ and $R^8$ are the same or different and each represent a hydrogen atom or a monovalent hydrocarbon group having 1 to 20 carbon atoms and X is a halogen atom such as F, Cl, Br or I, a RCOO— group or a RO— group) and n is an integer of 1 to 6;
compounds of the formula (V)

$$BZ_m \qquad (V)$$

wherein B is a hydrocarbon group having 4 to 40 carbon atoms, Z is a halogen atom, a RCOO— group or a RO— group, all attached to the tertiary carbon atom and m is an integer of 1 to 4;

oligomers having α-halostyrene units; etc. to which the compounds of the formula (I) are not limited. These compounds can be used singly or at least two of them are usable in mixture.

The group A having 1 to 4 aromatic rings in the compound of the formula (III) may be either a condensation product or a non-condensation product. Examples of such aromatic ring-containing groups are a monovalent to hexavalent phenyl group, biphenyl group, naphthalene group, anthracene group, phenanthrene group, pyrene group, group of Ph-(CH$_2$)l-Ph (wherein Ph is a phenyl group and l is an integer of 1 to 10), etc. These aromatic ring-containing groups may be substituted with a straight- and/or branched-chain aliphatic hydrocarbon group of 1 to 20 carbon atoms, or a group having a functional group such as hydroxyl group, ether group, vinyl group or the like.

The group Z in the compound of the formula (V) represents a halogen atom such as F, Cl, Br or I, a RCOO— group or a RO— group, all attached to the tertiary hydrocarbon group. The group B in the formula (V) is a hydrocarbon group having 4 to 40 carbon atoms among which an aliphatic hydrocarbon group is preferred. When the hydrocarbon has less than 4 carbon atoms, the halogen atom, RCOO-group or RO-group is not attached to the tertiary carbon atom with the result that polymerization fails to smoothly proceed. Thus the compound of the formula (V) having such hydrocarbon is not proper for use.

Oligomers having α-halostyrene units which are usable as an initiator and as a chain transfer agent include, for example, oligomers of α-chlorostyrene and oligomers produced by copolymerization of α-chlorostyrene with a monomer copolymerizable therewith.

When a compound of the formula (I) having halogen atoms, RCOO— groups or RO— groups as attached which are each at least two in number, or a compound of the formula (I) having halogen atom, RCOO— group or RO— group as attached and another reactive functional group is used as an initiator and concurrently as a chain transfer agent in the process of the invention, a polymer having functional groups at both ends, the so-called telechelic polymer, can be obtained which has terminal functional groups introduced in a high ratio. Thus such compound can be effectively used.

Examples of the foregoing compound useful both as an initiator and as a chain transfer agent are compounds of the following formulas

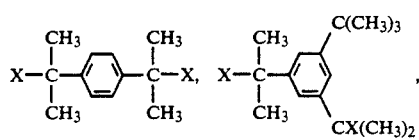

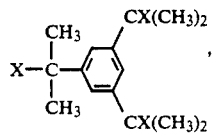

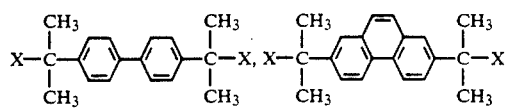

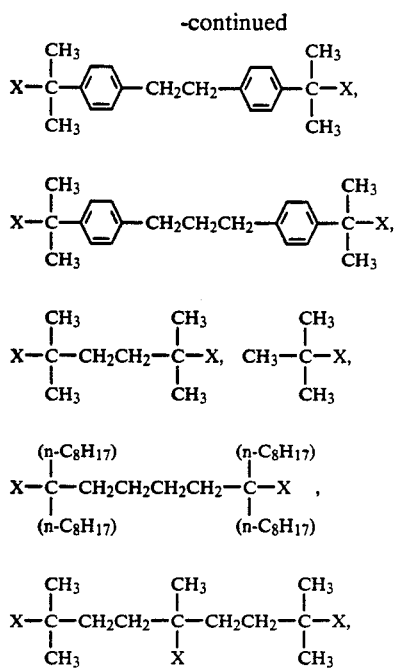

oligomers of α-chlorostyrene and like halogen-containing organic compounds and RCOO— group-containing organic compounds which are not limitative. Among these compounds, preferred are aromatic compounds having the structure which is unlikely to produce an indane-type skeleton as a by-product, such as those of the following formulas

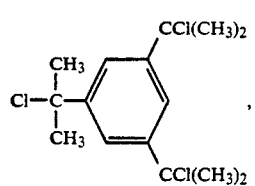

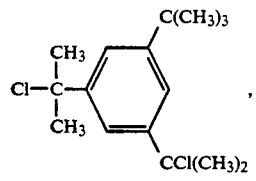

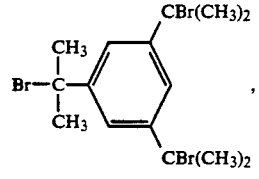

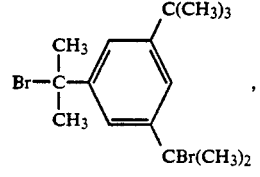

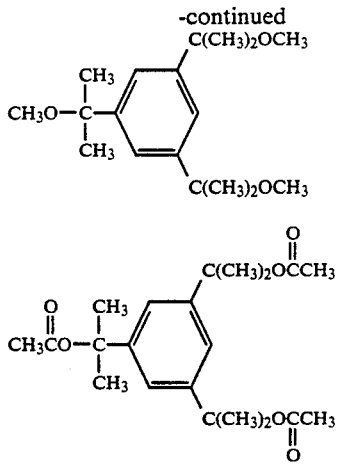

halogen-containing organic compounds having —C(CH$_3$)$_2$Cl or C(CH$_3$)$_2$Br which are likely to produce stable carbon cations, such as the compounds of the following formulas

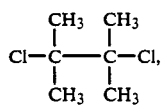

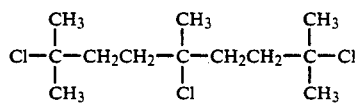

and compounds of the following formulas

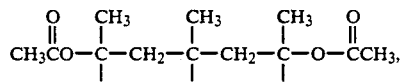

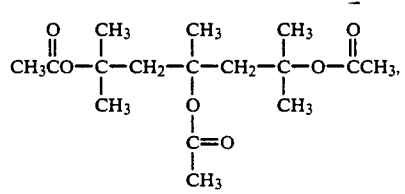

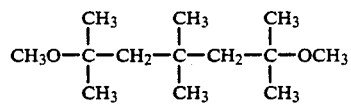

These compounds are used as the component which can act as an initiator and concurrently as a chain transfer agent. In the invention, the aforesaid compounds can be used singly or at least two of them are used in mixture. The molecular weight of the resulting polymer can be controlled by adjusting the amount of such compound to be used. In the present invention, the foregoing compound is used in an amount of about 0.01 to about 25%, preferably about 0.1 to about 15%, based on the cationically polymerizable isobutylene-containing monomer.

The Lewis acid is the component to be used as a catalyst in the invention, and is at least one class selected from the group consisting of (C$_2$H$_5$)$_2$AlCl, (C$_2$H$_5$)AlCl$_2$, SnCl$_4$ and TiCl$_4$. Preferred are TiCl$_4$ and SnCl$_4$. The amount of the Lewis acid used is 0.0001 to 0.5 equivalent based on the mole number of X in the organic compound of the formula (I) which is used as an initiator and concurrently as a chain transfer agent.

Used as the end capping agent in the present invention is a compound of the formula (II)

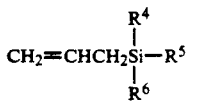
(II)

wherein R$^4$, R$^5$ and R$^6$ are as defined above. Examples of such compound are those of the following formulas

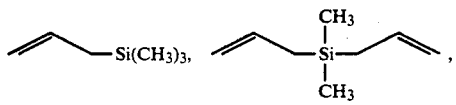

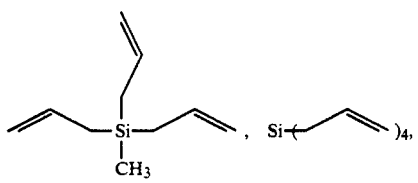

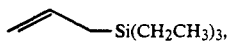

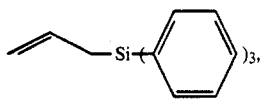

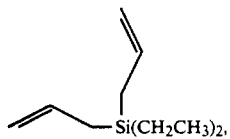

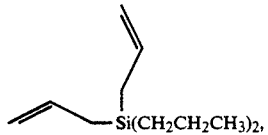

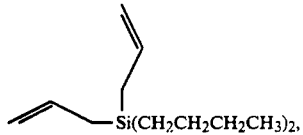

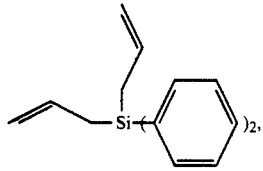

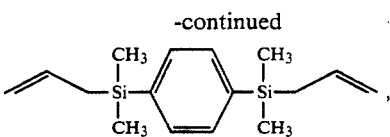

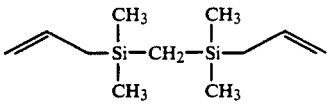

Among these compounds, preferred are those of the following formulas

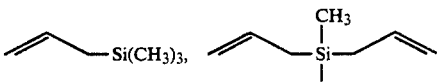

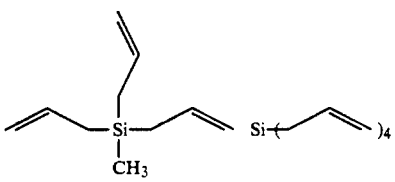

A preferred mole ratio of X in the organic compound of the formula (I) as the component (B) to the compound of the formula (II) as the component (D) in the present invention [(X)/(II), in terms of mole numbers of X and compound of the formula (II)] is in the range of 2.0:1 to 0.2:1.

Solvents useful in the invention include, for example, hydrocarbon solvents such as aliphatic hydrocarbon and halogenated hydrocarbon among which halogenated hydrocarbon is desirable, and chlorine-containing chlorinated hydrocarbon is more preferable. Specific examples of such aliphatic hydrocarbons are pentane, hexane, etc. Examples of useful halogenated hydrocarbons are chloromethane, chloroethane, methylene chloride, 1,1-dichloroethane, chloroform, 1,2-dichloroethane, etc. These hydrocarbons can be used singly or at least two of them are usable in mixture. The hydrocarbon can be used conjointly with a small amount of another solvent. Examples of such solvents are acetates such as ethyl acetate, nitro-containing organic compounds such as nitroethane, sulfoxides such as dimethylsulfoxide, sulfones, amide-containing organic compounds such as dimethylformamide and dimethylacetoamide, nitrile-containing organic compounds such as acetonitrile, etc.

A low polymerization temperature (i.e. 20° to −100° C.) is preferred in the present invention. Yet a relatively high polymerization temperature (i.e. 10° to −40° C.) is more preferred in the manufacture of polymers.

The polymerization time is in the range of about 0.5 to about 120 minutes, preferably about 1 to about 60 minutes. The monomer concentration in the polymerization is preferably about 0.1 to about 8 moles/l, more preferably about 0.5 to about 5 moles/l.

The polymerization reaction may be conducted batchwise (or semi-batchwise), or in a continuous manner such that the components (A), (B), (C) and (D) are continuously charged into the reactor.

According to the invention, an isobutylene-type polymer having unsaturated groups introduced in a high ratio to ends can be produced at low costs by a simplified process. The process of the invention gives an isobutylene-type polymer having a narrow molecular weight distribution.

EXAMPLES

The present invention will be described below in more detail with reference to the following examples.

EXAMPLE 1

A three-way cock was attached to a 200 ml-vol. pressure-resistant glass reactor for polymerization and the reactor was evacuated with use of a vacuum line and dried by heating at 100° C. for 1 hour. The reactor was cooled to room temperature and the internal pressure was restored to normal pressure with nitrogen using the three-way cock.

Thereafter, while feeding nitrogen to the reactor through the three-way cock, 40 ml of 1,1-dichloroethane dried over calcium hydride was introduced as a main solvent into the reactor with a syringe. A 5 mmoles quantity of allyltrimethylsilane obtained by distillation and purification was added, followed by addition of 10 ml of a solution of 2 mmoles of TCC (Compound A) in 1,1-dichloroethane.

A 7 g quantity of isobutylene dehydrated by passage through a barium-oxide containing column was placed into a pressure-resistant glass tube for collection of liquefied gas equipped with a needle valve. The tube was connected to the three-way cock with a pressure-resistant rubber tube. Thereafter, the reactor body was immersed in a dry ice-acetone bath maintained at −70° C. to cool the contents of the reactor for 1 hour. After cooling, the internal pressure of the reactor was reduced with a vacuum line and the needle valve was opened to transfer the isobutylene from the liquefied gas-collecting pressure-resistant glass tube to the reactor. The internal pressure of the reactor was restored to normal pressure by introducing nitrogen through the three-way cock into the reactor. The reactor was immersed in a dry ice-acetone bath at −10° C. for 1 hour to raise the temperature in the reactor to −10° C.

Next, 1.9 g (10 mmoles) of TiCl₄ was fed to the reactor with a syringe through three-way cock to initiate the reaction for polymerization. After a lapse of 60 minutes, methanol cooled to not higher than 0° C was added to complete the reaction.

Thereafter, the reaction mixture was collected in an eggplant type flask and the unreacted isobutylene, 1,1-dichloroethane, allyltrimethylsilane and methanol were distilled off. The remaining polymer was dissolved in 100 ml of n-hexane and the obtained solution was washed with water repeatedly until the solution was made neutral. The n-hexane solution was concentrated to 20 ml and the concentrate was added to 300 ml of acetone. The resulting mixture was stirred to precipitate the polymer from the mixture.

The polymer thus obtained was dissolved in 100 ml of n-hexane again, the resulting solution was dried over anhydrous magnesium sulfate and the solids content was separated by filtration. The n-hexane was distilled off under reduced pressure, giving an isobutylene-type polymer.

The yield of the obtained polymer was calculated from the amount thereof. $\overline{M}n$ and $\overline{M}w/\overline{M}n$ were determined by gel permeation chromatography and the structure of the terminal in the polymer was identified by :H-NMR (300 MHz) analysis. Table 2 shows the results.

EXAMPLES 2 TO 16

A polymer was prepared and evaluated in the same manner as in Example 1 with the exception of using varied kinds of the compounds serving as an initiator and concurrently as a chain transfer agent, catalyst, and additional solvent in the amounts and employing the polymerization temperatures, as shown below in Table 1. Table 2 shows the results.

COMPARISON EXAMPLES 1 TO 7

Polymers were produced in the same manner as in Example 1 except that allyltrimethylsilane was not used and that the kind and amount of compounds serving as an initiator and concurrently as a chain transfer agent and catalyst and polymerization temperature were changed as shown below in Table 1. Table 2 shows the results.

COMPARISON EXAMPLE 8

A polymer was prepared and evaluated in the same manner as in Example 8 with the exception of using BCl₃ (10 mmoles) as a Lewis acid. Table 2 shows the results.

In Table 1, the compounds A to E used as an initiator and concurrently as a chain transfer agent are the compounds represented by the following formulas.

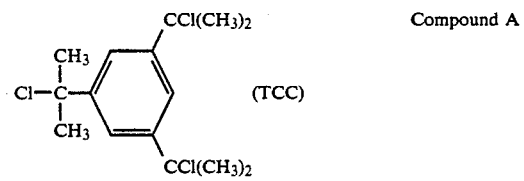

Compound A (TCC)

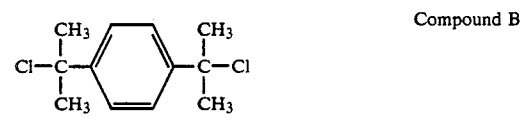

Compound B

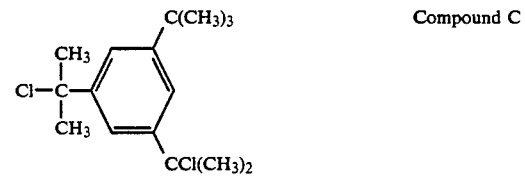

Compound C

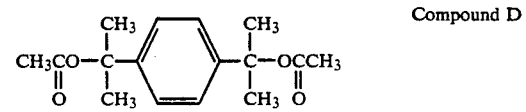

Compound D

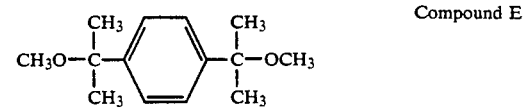

Compound E

TABLE 1

| Example No. | Compound as an initiator and concurrently as a chain transfer agent Kind | Amount (mmol) | Catalyst | Main solvent Kind | Volume (ml) | Additional solvent Kind | Volume (ml) | Polymerization temperature (°C.) |
|---|---|---|---|---|---|---|---|---|
| 1 | Compound A | 2 | $TiCl_4$ | $CH_3CHCl_2$ | 50 | — | — | −10 |
| 2 | Compound A | 2 | $TiCl_4$ | $CH_3CHCl_2$ | 50 | — | — | −70 |
| 3 | Compound A | 2 | $TiCl_4$ | $CH_3CHCl_2$ | 50 | $C_2H_5NO_2$ | 5 | −10 |
| 4 | Compound A | 2 | $SnCl_4$ | $CH_3CHCl_2$ | 50 | — | — | −10 |
| 5 | Compound A | 2 | $Et_2AlCl$ | $CH_3CHCl_2$ | 50 | — | — | −10 |
| 6 | Compound A | 2 | $Et_2AlCl$ | $CH_3CHCl_2$ | 50 | — | — | −10 |
| 7 | Compound B | 2 | $TiCl_4$ | $CH_3CHCl_2$ | 50 | — | — | −10 |
| 8 | Compound B | 2 | $TiCl_4$ | $CH_3CHCl_2$ | 50 | — | — | −70 |
| 9 | Compound B | 2 | $TiCl_4$ | $CH_3CHCl_2$ | 50 | $C_2H_5NO_2$ | 10 | −10 |
| 10 | Compound B | 2 | $Et_2AlCl$ | $CH_3CHCl_2$ | 50 | — | — | −10 |
| 11 | Compound B | 2 | $Et_2AlCl$ | $CH_3CHCl_2$ | 50 | — | — | −70 |
| 12 | Compound C | 2 | $TiCl_4$ | $CH_3CHCl_2$ | 50 | — | — | −10 |
| Example 13 | Compound C | 2 | $TiCl_4$ | $CH_3CHCl_2$ | 50 | — | — | −70 |
| Example 14 | Compound C | 2 | $TiCl_4$ | $CH_3CHCl_2$ | 50 | $C_2H_5NO_2$ | 10 | −10 |
| Example 15 | Compound D | 2 | $TiCl_4$ | $CH_3CHCl_2$ | 50 | $C_2H_5NO_2$ | 5 | −10 |
| Example 16 | Compound E | 2 | $SnCl_4$ | $CH_3CHCl_2$ | 50 | — | — | −10 |
| Comp. Ex. 1 | Compound A | 2 | $TiCl_4$ | $CH_3CHCl_2$ | 50 | — | — | −10 |
| Comp. Ex. 2 | Compound A | 2 | $TiCl_4$ | $CH_3CHCl_2$ | 50 | — | — | −70 |
| Comp. Ex. 3 | Compound A | 2 | $SnCl_4$ | $CH_3CHCl_2$ | 50 | — | — | −10 |
| Comp. Ex. 4 | Compound B | 2 | $TiCl_4$ | $CH_3CHCl_2$ | 50 | — | — | −10 |
| Comp. Ex. 5 | Compound B | 2 | $TiCl_4$ | $CH_3CHCl_2$ | 50 | — | — | −70 |
| Comp. Ex. 6 | Compound B | 2 | $Et_2AlCl$ | $CH_3CHCl_2$ | 50 | — | — | −10 |
| Comp. Ex. 7 | Compound B | 2 | $Et_2AlCl$ | $CH_3CHCl_2$ | 50 | — | — | −70 |
| Comp. Ex. 8 | Compound B | 2 | $BCl_3$ | $CH_3CHCl_2$ | 50 | — | — | −70 |

TABLE 2

| Example No. | Yield (%) | Number-average molecular weight $\overline{M}n$ | Molecular weight distribution $\overline{M}w/\overline{M}n$ | Amount of functional group* Group of the formula $-\underset{\underset{CH_3}{\mid}}{\overset{\overset{CH_3}{\mid}}{C}}-CH_2CH=CH_2$ | Olefin group** | Indanyl group |
|---|---|---|---|---|---|---|
| 1 | 90 | 2900 | 1.30 | 2.8 | 0.2 | 0 |
| 2 | 90 | 3000 | 1.15 | 2.9 | 0.1 | 0 |
| 3 | 65 | 2600 | 1.10 | 3.0 | 0 | 0 |
| 4 | 90 | 3300 | 1.25 | 2.8 | 0.2 | 0 |
| 5 | 90 | 2800 | 1.30 | 2.9 | 0.1 | 0 |
| 6 | 95 | 3100 | 1.40 | 2.9 | 0.1 | 0 |
| 7 | 85 | 3600 | 1.28 | 1.8 | 0.1 | 0.1 |
| 8 | 90 | 3800 | 1.20 | 1.9 | 0 | 0.1 |
| 9 | 70 | 3400 | 1.15 | 2.0 | 0 | 0 |
| 10 | 95 | 2800 | 1.50 | 1.9 | 0 | 0.1 |
| 11 | 95 | 3000 | 1.30 | 1.95 | 0 | 0.05 |
| 12 | 95 | 4000 | 1.25 | 1.9 | 0.1 | 0 |
| 13 | 90 | 3900 | 1.20 | 2.0 | 0 | 0 |
| 14 | 60 | 3400 | 1.15 | 2.0 | 0 | 0 |
| 15 | 85 | 3200 | 1.35 | 1.9 | 0 | 0.1 |
| 16 | 95 | 3500 | 1.45 | 1.9 | 0 | 0.1 |

| Comparison Example No. | Yield (%) | Number-average molecular weight $\overline{M}n$ | Molecular weight distribution $\overline{M}w/\overline{M}n$ | Amount of functional group* Group of the formula $-\underset{\underset{CH_3}{\mid}}{\overset{\overset{CH_3}{\mid}}{C}}-CH_2CH=CH_2$ | Olefin group** | Indanyl group |
|---|---|---|---|---|---|---|
| 1 | 95 | 8400 | 3.80 | — | 2.8 | 0 |
| 2 | 90 | 5200 | 2.80 | — | 0.6 | 0 |
| 3 | 95 | 4800 | 2.15 | — | 2.9 | 0 |
| 4 | 90 | 7800 | 3.40 | — | 0.7 | 0.8 |
| 5 | 90 | 5300 | 2.45 | — | 0.3 | 0.6 |
| 6 | 90 | 6400 | 2.85 | — | 0.4 | 0.2 |
| 7 | 95 | 5600 | 2.30 | — | 0 | 0.1 |

TABLE 2-continued

| 8 | 90 | 3500 | 2.10 | 0.4 | 0.2 | 0.1 |

Note—
*Number per molecule of the polymer
**Olefin groups are those of the formulas $-\underset{\underset{CH_3}{|}}{C}=CH_2$ and $-CH=\underset{\underset{CH_3}{|}}{C}-CH_3$ The results shown in Table 2 reveal the followings. When a specific Lewis acid is used in the process of the present invention, side reactions are inhibited by the presence of allylsilane in the polymerization reaction system in advance despite the use of a compound serving as an initiator and concurrently as a chain transfer agent, and even polymerization at a relatively high temperature gives an oligomer in a high yield which oligomer has allyl terminal groups introduced in a high ratio and a narrow molecular weight distribution (Examples to 18 and Comparison Examples 1 to 9).

In Comparison Examples 3 and 9 (described hereinafter), the polymerization was terminated by deprotonation, preferentially producing olefin terminal groups (isopropenyl and internal olefin), but little or no Cl terminal group. Similarly, the groups represented by the formulas

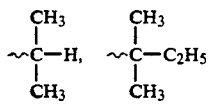

and the like were preferentially produced due to protonation and alkylation when the polymerization was terminated in Comparison Examples 6 and 7, but substantially no Cl terminal group was found (A similar reaction was carried out using a low-molecular model compound to confirm this behavior according to GAS-MASS analysis).

The aforementioned behavior in Comparison Examples 1 to 9 and the results obtained in Examples 1 to 18 indicate the following.

In the polymerization in the reaction system having allyltrimethylsilane present therein as in the process of the invention, a reaction between the cation-containing component and the allysialne (termination reaction) occurs in competition with a reaction between the cation-containing component and the monomer (propagation reaction). In brief, allyl groups are introduced by direct attack against cations, and it can be said that Cl groups are not replaced with allyl groups after the formation of tertiary Cl groups.

This suggests that an isobutylene-type polymer containing allyl groups is obtained by a mechanism clearly different from the one as described in the foregoing Japanese Unexamined Patent Publication No. 105005/1988 (the mechanism including the formation of tertiary Cl groups).

EXAMPLE 17

A three-way cock was attached to a 200 ml-vol. pressure-resistant glass reactor and the reactor was dried by heating at 100° C. for 1 hour while being evacuated by means of a vacuum line. The reactor was cooled to room temperature and the internal pressure was restored to normal pressure with nitrogen.

Thereafter, while feeding nitrogen to the autoclave through the three-way cock, the autoclave was charged with a solution of 0.308 g (1 mmol) of TCC (Compound A) in 30 ml of methylene chloride dried over calcium hydride and serving as a solvent for polymerization and with 0.51 ml (3.2 mmoles) of allyltrimethylsilane using a syringe.

A 5 g quantity of isobutylene dehydrated by passage through a barium oxide-containing column was placed into a pressure-resistant glass tube for collection of liquefied gas equipped with a needle valve. The tube was connected to the three-way cock with a pressure-resistant rubber tube. The reactor body was immersed in a dry ice-acetone bath maintained at $-30°$ C. and the contents of the reactor were cooled with stirring for hour. After cooling, the internal pressure of the reactor was reduced with a vacuum line and the needle valve was opened to transfer the isobutylene from the liquefied gas-collecting pressure-resistant glass tube to the reactor. The internal pressure was restored to normal pressure by introducing nitrogen through the three-way cock into the reactor.

A solution of 0.055 ml (0.5 mmol) of titanium tetrachloride in 5 ml of methylene chloride was added with a syringe to initiate a polymerization reaction.

After a lapse of 60 minutes, the solution obtained by the polymerization was added to 100 ml of an aqueous solution of saturated sodium hydrogencarbonate. The resulting mixture was shaked and the organic layer was washed with 100 ml of water twice. The organic layer was concentrated to 10 ml and added to 300 ml of acetone, followed by stirring to precipitate the polymer from the mixture.

The polymer thus obtained was dissolved in 80 ml of n-hexane and the solution was dried over anhydrous magnesium sulfate to separate the solids content by filtration. The n-hexane was distilled off under reduced pressure, giving an isobutylene-type polymer.

The yield of the obtained polymer was calculated from the amount thereof. $\overline{Mn}$ and $\overline{Mw}/\overline{Mn}$ were determined by gel permeation chromatography and the structure of the terminals was identified by $^1$H-NMR (300 MHz) analysis. Table 3 below shows the results.

A polymer having allyl groups introduced in a high ratio was obtained in a high yield.

The allyl-terminated polyisobutylene obtained in this example is represented by the following formula (VI)

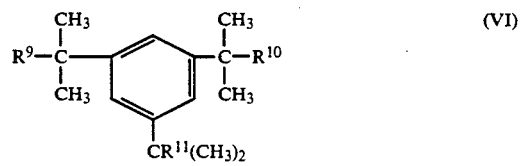

wherein $R^9$, $R^{10}$ and $R^{11}$ are each a polyisobutylene chain having allyl groups at its ends, and the isobutylene chains represented by $R^9$, $R^{10}$ and $R^{11}$ may be the same or different in length.

COMPARISON EXAMPLE 9

A polymer was prepared in the same manner as in Example 17 with the exception of not using allyltrimethylsilane, and the structure of the obtained polymer was analyzed. Table 3 shows the results. Use of titanium tetrachloride in a catalytic amount as in this example resulted in the preparation of the desired product in a satisfactory yield. However, the obtained polymer was braod in molecular weight distribution and various functional terminal groups were formed.

COMPARISON EXAMPLE 10

A polymer was produced and evaluated by the same procedure as in Comparison Example 8 except that 0.51 ml (3.2 mmoles) of allyltrimethylsilane was added after completion of the polymerization reaction and that the reaction mixture was stirred at room temperature for 6 hours in a nitrogen atmosphere. The results are shown in Table 3. The obtained polymer had allyl groups introduced in a low ratio to ends and was broad in molecular weight distribution.

EXAMPLE 18

A polymer was prepared in the same manner as in Example 17 with the exception of using allyltrimethylsilane in an amount changed to 0.71 ml (4.5 mmoles), and the structure of the obtained polymer was analyzed. Table 3 shows the results. A larger amount of allyltrimethylsilane used resulted in the production of a polymer having a lower number average molecular weight. However, the polymer is substantially the same as the product obtained in Example 17 in the number of moles. This means that allyltrimethylsilane acted as a short-stop.

mmoles) quanity of allyltrimethylsilane which was distilled and purified was added thereto, followed by addition of a solution of 21.3 g (69 mmoles of TCC (Compound A) in 1,1-dichloroethane.

A 330 g quantity of isobutylene dehydrated by passage through a barium oxide-containing column was placed into a pressure-resistant glass tube for collection of liquefied gas equipped with a needle valve. The tube was connected to the three-way cock with a pressure-resistant rubber tube. The reactor body was immersed in a dry ice-acetone bath maintained at $-70°$ C. and the contents of the reactor were cooled with stirring for hour. After cooling, the internal pressure of the reactor was reduced by means of the vacuum line and the needle valve was opened to transfer the isobutylene from the liquefied gas-collecting pressure-resistant glass tube to the reactor. The internal pressure of the reactor was restored to normal pressure by introducing nitrogen through the three-way cock into the reactor and the reactor was immersed in a dry ice-acetone bath at $-30°$ C. for 1 hour to raise the temperature in the reactor to $-30°$ C.

Thereafter, 50 ml of a solution of 3.9 ml (35 mmoles) of titanium tetrachloride in 1,1-dichloroethane was added dropwise at a constant rate over a period of 30 minutes so as to maintain the polymerization temperature at $-30°$ to $-25°$ C. The resulting solution was stirred at $-30°$ hour, 2 l of a saturated aqueous solution of sodium hydrogencarbonate was added and the resulting mixture was vigorously agitated.

The organic layer was collected in an eggplant type flask and the unreacted isobutylene, 1,1-dichloroethane, allyltrimethylsilane were distilled off. The remaining polymer was dissolved in 1500 ml of n-hexane and the solution thus obtained was washed with water repeat-

TABLE 3

| | Yield 1) | GPC | | NMR 2) | | | |
|---|---|---|---|---|---|---|---|
| | (%) | $\overline{Mn}$ | $\overline{Mw}/\overline{Mn}$ | Fn (Allyl) | Fn (Chloro) | Fn (1-Olefin) | Fn (2-Olefin) |
| Ex. 17 | 100 | 4600 | 1.7 | 2.8 | 0.1 | 0.1 | 0 |
| Ex. 18 | 46 | 2400 | 1.3 | 2.9 | 0 | 0.1 | 0 |
| Comp. Ex. 9 | 100 | 4500 | 4.7 | — | 0.8 | 0.7 | 1.6 |
| Comp. Ex. 10 | 100 | 4600 | 4.5 | 0.6 | 0.2 | 0.8 | 1.5 |

Note
1) Yield of monomers
2) Allyl terminal group

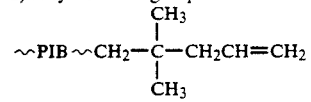

Cl terminal group

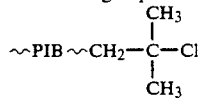

1-Olefin

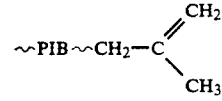

2-Olefin

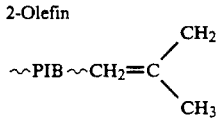

EXAMPLE 19

A 3 l-vol. flask for use as a polymerization reactor was provided with an agitating blade, a three-way cock and a vacuum line. While being evacuated with use of the vacuum line, the polymerization reactor was dried by heating at 100° C. for 1 hour. The reactor was cooled to room temperature and the internal pressure was restored to normal pressure with nitrogen passed through the three-way cock.

While feeding nitrogen to an autoclave through the three-way cock, the autoclave was charged, using a syringe, with 1700 ml of 1,1-dichloroethane which was a solvent dried over calcium hydride. A 35.5 ml (224 edly until the solution was made neutral. The n-hexane solution was concentrated to 600 ml and the concentrated solution was added to 3 l of acetone, followed by stirring to precipitate the polymer from the solution.

The polymer thus obtained was dissolved in 1000 ml of n-hexane again and dried over anhydrous magnesium sulfate, and the solids content was separated by filtration. The n-hexane was distilled off under reduced pressure, giving an isobutylene-type polymer.

The yield of the obtained polymer was calculated from the amount thereof. $\overline{Mn}$ and $\overline{Mw}/\overline{Mn}$ were determined by gel permeation chromatography and the structure of the terminals in the polymer was identified by $^1$H-NMR (300 MHz) analysis. Table 4 shows the results.

EXAMPLE 20

In this example, a polymer was prepared and the structure thereof was analyzed in the same manner as in Example 19 except that 55 ml (500 mmoles) of titanium tetrachloride was added at one time and that the initial polymerization temperature was adjusted to −70° C. in order to avoid a hazard occurring owing to the rise of temperature during the polymerization reaction. Table 4 shows the results. In Example 20, the rise of the reaction temperature amounted to 72° C. and the obtained polymer had allyl groups introduced in a slightly lower ratio.

TABLE 4

|  | Initial polymerization temperature (°C.) | Rise of temperature (°C.) | NMR $\overline{F}n$ (allyl) |
|---|---|---|---|
| Example 19 | −30 | 5 | 3.0 |
| Example 20 | −70 | 72 | 2.2 |

The results obtained in Example 20 show that the polymerization reaction conducted in this example entailed a great degree of heat evolution. However, the rise of temperature during the polymerization can be suppressed to not more than 5° C. by the procedure of Example 19.

EXAMPLE 21

First, a monomer solution (a) and a solution of titanium tetrachloride (b) were prepared.

The monomer solution (a) comprised 80 g (1430 mmoles, 2.86 M) of isobutylene, 5.24 g (17 mmoles, 34 mM) of tricumyl chloride, 9.4 ml (60 mmoles, 120 mM) of allyltrimethylsilane and 400 ml of methylene chloride dried over calcium hydride. The solution of titanium tetrachloride (b) comprised 1.1 ml (10 mmoles, 50 mM) of titanium tetrachloride and 200 ml of methylene chloride dried over calcium hydride.

The monomer solution (a) and the solution of titanium tetrachloride (b) were introduced into a glass tube for polymerization as shown in FIG. 1 using a constant delivery pump. In this case, the monomer solution (a) and the solution of titanium tetrachloride (b) were fed to the glass tube so that the two solutions were mixed together only in the tube. The monomer solution (a) was introduced at a rate of about 10 ml/min, and the solution of titanium tetrachloride (b) at a rate of about 4 ml/min. The glass tube for polymerization was a spiral one having an inside diameter of 4 mm and a length of 10 m, and was immersed in an acetone bath maintained at −35° C.

The polymerization reaction was completed during the passage of the mixed solutions (a) and (b) through the tube. The obtained solution containing an isobutylene-type polymer was transferred from the tube to an aqueous solution of sodium hydrogencarbonate and the resulting mixture was vigorously stirred.

Thereafter, the polymer eventually obtained was purified and the structure thereof was analyzed in the same manner as in Example 19. Table 5 below shows the results.

TABLE 5

| | NMR $\overline{F}n$ (Cl + 1- |

TABLE 5-continued

| | Yield (%) | GPC $\overline{M}n$ | $\overline{M}w/\overline{M}n$ | $\overline{F}n$ (allyl) | Olefin + 2-Olefin |
|---|---|---|---|---|---|
| Ex. 21 | 100 | 4700 | 1.4 | 3.0 | 0.1 |

The results shown in Table 5 reveal that the process of the present invention, when conducted by a continuous polymerization method, can provide polymers in a high yield which are uniform in molecular weight and which had allyl groups introduced in a high ratio to ends.

Figure 1:
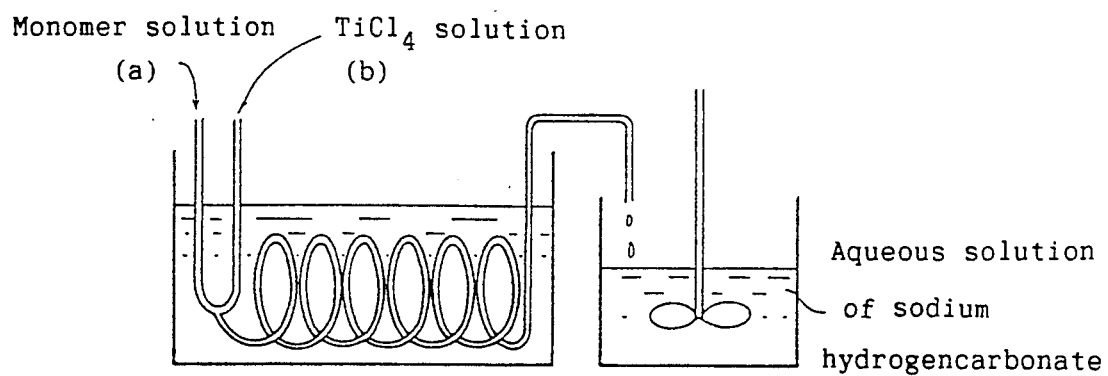
FIG. 1 is a view schematically showing an apparatus for continuous polymerization used in Example 21.

We claim:

1. A process for preparing an isobutylene-type allyl-terminated polymer, the process comprising mixing:
   (A) a cationically polymerizable isobutylene-containing monomer;
   (B) an organic compound serving as an initiator and concurrently as a chain transfer agent, the organic compound being represented b the formula (I)

$$R^3-\underset{\underset{R^2}{|}}{\overset{\overset{R^1}{|}}{C}}-X \quad (I)$$

wherein X is a halogen atom, a RCOO-group (wherein R is a monovalent organic group, the same hereinafter) or a RO-group, $R^3$ is a polyvalent aromatic ring group or a substituted or unsubstituted polyvalent aliphatic hydrocarbon group, and $R^1$ and $R^2$ are the same or different and each represent a hydrogen atom or a substituted or unsubstituted monovalent hydrocarbon group, provided that when $R^3$ is a polyvalent aliphatic hydrocarbon group, $R^1$ and $R^2$ can not be concurrently a hydrogen atom;
   (C) a Lewis acid selected from the group consisting of SnCl$_4$ and TiCl$_4$; and
   (D) a compound serving as an end capping agent, the compound being represented by the formula (II)

$$CH_2=CHCH_2\underset{\underset{R^6}{|}}{\overset{\overset{R^4}{|}}{Si}}-R^5 \quad (II)$$

wherein $R^4$, $R^5$ and $R^6$ are the same or different, and each represent a monovalent organic group or a monovalent organic group containing 1 to 3 silicon atoms, whereby the cationically polymerizable monomer is polymerized at −40° to 10° C.

2. A process according to claim 1 wherein the amount of the component (C) used is 0.0001 to 0.5 equivalent based on X in the organic compound of the formula (I) serving as the component (B).

3. A process according to claim 1 wherein the compound of the formula (II) used as the component (D) is at least one compound selected from the compounds of the formulas:

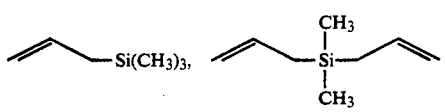
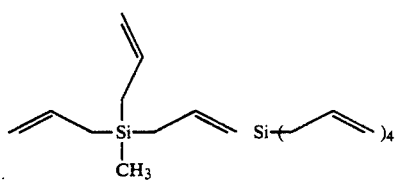
4. A process according to claim wherein the polymerization reaction is conducted at −40° to 10° C.
* * * * *